United States Patent
Wu et al.

(10) Patent No.: US 10,964,315 B1
(45) Date of Patent: Mar. 30, 2021

(54) MONOPHONE-BASED BACKGROUND MODELING FOR WAKEWORD DETECTION

(71) Applicant: Amazon Technologies, Inc., Seattle, WA (US)

(72) Inventors: Minhua Wu, San Jose, CA (US); Sankaran Panchapagesan, Mountain View, CA (US); Ming Sun, Winchester, MA (US); Shiv Naga Prasad Vitaladevuni, Belmont, MA (US); Bjorn Hoffmeister, Seattle, WA (US); Ryan Paul Thomas, Redmond, WA (US); Arindam Mandal, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/639,330

(22) Filed: Jun. 30, 2017

(51) Int. Cl.
| | | |
|---|---|---|
| *G10L 15/22* | (2006.01) | |
| *G10L 15/14* | (2006.01) | |
| *G10L 15/02* | (2006.01) | |
| *G10L 15/16* | (2006.01) | |
| *G10L 25/30* | (2013.01) | |
| *G10L 15/08* | (2006.01) | |

(52) U.S. Cl.
CPC ............ *G10L 15/22* (2013.01); *G10L 15/02* (2013.01); *G10L 15/142* (2013.01); *G10L 15/16* (2013.01); *G10L 25/30* (2013.01); *G10L 2015/025* (2013.01); *G10L 2015/088* (2013.01); *G10L 2015/223* (2013.01)

(58) Field of Classification Search
CPC ....... G10L 15/02; G10L 15/08; G10L 15/142; G10L 2015/025; G10L 15/22
See application file for complete search history.

(56) References Cited

U.S. PATENT DOCUMENTS

| | | | |
|---|---|---|---|
| 9,159,319 B1* | 10/2015 | Hoffmeister | ............ G10L 15/08 |
| 9,542,939 B1* | 1/2017 | Hoffmeister | .......... G10L 15/148 |
| 9,865,253 B1* | 1/2018 | De Leon | ................. G10L 17/02 |
| 2006/0074664 A1* | 4/2006 | Lam | ...................... G10L 15/142 |
| | | | 704/255 |

(Continued)

OTHER PUBLICATIONS

Y. Benayed et al., "Confidence Measures for Keyword Spotting Using Suport Vector Machines", 2003, IEEE, pp. 588-591 (Year: 2003).*

(Continued)

*Primary Examiner* — Mark Villena
(74) *Attorney, Agent, or Firm* — Occhiuti & Rohlicek LLP (57) ABSTRACT

An approach to wakeword detection uses an explicit representation of non-wakeword speech in the form of subword (e.g., phonetic monophone) units that do not necessarily occur in the wakeword and that broadly represent general speech. These subword units are arranged in a "background" model, which at runtime essentially competes with the wakeword model such that a wakeword is less likely to be declare as occurring when the input matches that background model well. An HMM may be used with the model to locate possible occurrences of the wakeword. Features are determined from portions of the input corresponding to subword units of the wakeword detected using the HMM. A secondary classifier is then used to process the features to yield a decision of whether the wakeword occurred.

20 Claims, 8 Drawing Sheets

(56) References Cited

U.S. PATENT DOCUMENTS

| | | | | |
|---|---|---|---|---|
| 2007/0112568 | A1* | 5/2007 | Fingscheidt | G10L 15/063 704/256.2 |
| 2008/0010065 | A1* | 1/2008 | Bratt | G06K 9/6222 704/246 |
| 2014/0012586 | A1* | 1/2014 | Rubin | G10L 25/51 704/273 |
| 2015/0073795 | A1* | 3/2015 | Tan | G10L 15/063 704/243 |
| 2016/0092766 | A1* | 3/2016 | Sainath | G10L 25/30 706/20 |
| 2016/0260429 | A1* | 9/2016 | Jin | G10L 15/08 |
| 2016/0358619 | A1* | 12/2016 | Ramprashad | G10L 15/34 |
| 2017/0256255 | A1* | 9/2017 | Bocklet | G06F 17/3053 |
| 2018/0068653 | A1* | 3/2018 | Trawick | G10L 15/02 |

OTHER PUBLICATIONS

Wilpon, J. G., Miller, L. G., & Modi, P. (Apr. 1991). Improvements and applications for key word recognition using hidden Markov modeling techniques. In Acoustics, Speech, and Signal Processing, 1991. ICASSP-91., 1991 International Conference on (pp. 309-312). IEEE.

Wilpon, J. G., Rabiner, L. R., Lee, C. H., & Goldman, E. R. (1990). Automatic recognition of keywords in unconstrained speech using hidden Markov models. IEEE Transactions on Acoustics, Speech, and Signal Processing, 38(11), 1870-1878.

Rose, R. C., & Paul, D. B. (Apr. 1990). A hidden Markov model based keyword recognition system. In Acoustics, Speech, and Signal Processing, 1990. ICASSP-90., 1990 International Conference on (pp. 129-132). IEEE.

Gish, H., & Ng, K. (Apr. 1993). A segmental speech model with applications to word spotting. In Acoustics, Speech, and Signal Processing, 1993. ICASSP-93., 1993 IEEE International Conference on (vol. 2, pp. 447-450). IEEE.

Junqua, J. C., & Haton, J. P. (2012). Robustness in automatic speech recognition: fundamentals and applications (vol. 341). Springer Science & Business Media. Ch. 10, "Word-Spotting and Rejection", 21 pages.

Rohlicek, J. R., Russell, W., Roukos, S., & Gish, H. (May 1989). Continuous hidden Markov modeling for speaker-independent word spotting. In Acoustics, Speech, and Signal Processing, 1989. ICASSP-89., 1989 International Conference on (pp. 627-630). IEEE.

Rohlicek, J. R., Jeanrenaud, P., Ng, K., Gish, H., Musicus, B., & Siu, M. (Apr. 1993). Phonetic training and language modeling for word spotting. In Acoustics, Speech, and Signal Processing, 1993. ICASSP-93., 1993 IEEE International Conference on (vol. 2, pp. 459-462). IEEE.

Rohlicek, J. R. (1995). Word spotting, in R. P. Ramachandran et al. (ed .), Modern Methods of Speech Processing, Kluwer Academic Publishers 1995. pp. 123-157.

Chen, G., Parada, C., & Heigold, G. (May 2014). Small-footprint keyword spotting using deep neural networks. In Acoustics, Speech and Signal Processing (ICASSP), 2014 IEEE International Conference on (pp. 4087-4091). IEEE.

* cited by examiner

MONOPHONE-BASED BACKGROUND MODELING FOR WAKEWORD DETECTION

BACKGROUND

This invention relates to use of a monophone background model for wakeword detection.

One approach to providing a speech-based user interface for a speech-enabled system is to use a device that monitors an acoustic environment waiting for a user to speak a command that can be interpreted by the system. The system may determine when the speaker intends to interact via the interface by determining when the speaker utters a particular word or phrase designed to "wake" the system. Such a word or phrase may be referred to as a "wakeword" or a "trigger word."

Speech recognition used to determine the words spoken and further understand the intent of the speaker may be computationally expensive, and may be beyond the computational capacity of devices that may be located in the acoustic environment being monitored. One approach to addressing the limited computational capacity of such devices is to perform some of the computation on a server coupled to the devices over a data network, for instance over the public Internet. In some such approaches, the devices send audio data to the server only after a speaker utters the wakeword, and the server performs much of the computation required to interpret the speaker's input.

DESCRIPTION OF DRAWINGS

FIGS. 2A-E are block diagrams of components of the system shown in FIG. 1.

DETAILED DESCRIPTION

Figure 1:
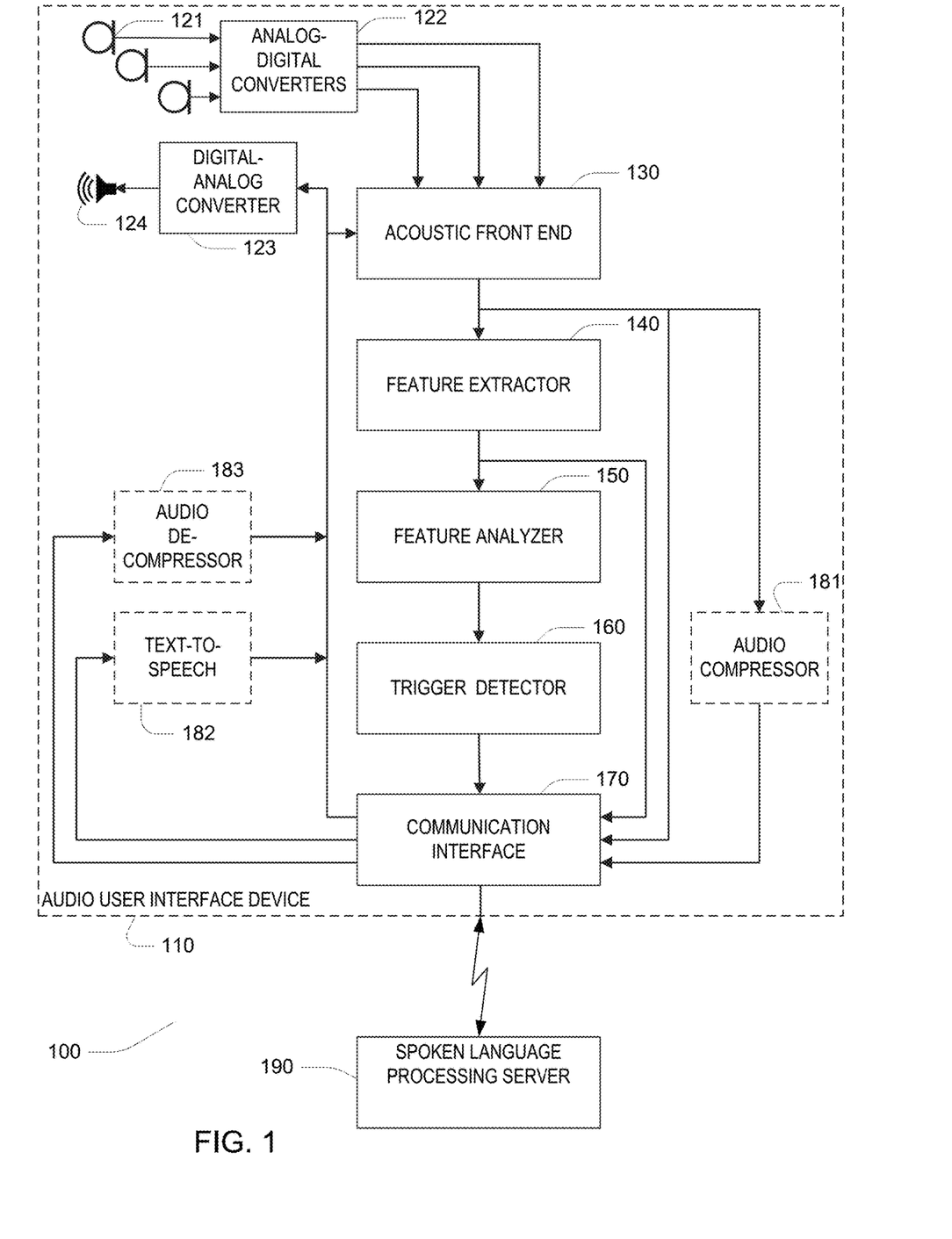
FIG. 1 is a block diagram of a spoken language processing system with an audio user interface device that uses a trigger detector.

Referring to FIG. 1, a spoken language processing system 100 includes an audio user interface device 110 and a spoken language processing system 190, which is generally distant from the device 110 and in data communication with the device over a network, for instance over the public Internet. In the embodiment shown in FIG. 1, the user interface device 110 includes one or more microphones 121, which sense an acoustic environment in which the device 110 is placed. For example, the device 110 may be placed in a living room of a residence, and the microphones acquire (i.e., sense) an acoustic signal in the environment and produce corresponding analog or digital signals, where the acoustic signal may include speech and non-speech sounds. Users in the environment may interact with the system 100. One way for a user to indicate to the system that he or she wishes to interact is to speak a "trigger" (where "trigger" is used to denote something that initiates a process or action), which may be a predetermined word or phrase (which may be referred to as a "wakeword" or "trigger word") or some other acoustically distinct event. This trigger is detected by the device 110 at a particular time (e.g., a time instance or interval), and upon detection of the trigger, the device passes audio data (e.g., a digitized audio signal or some processed form of such a signal) to a spoken language processing server 190. The device 110 selects a part of the audio data corresponding to a time including an interval of the acoustic signal from a starting time and an ending time, for example, based on an estimate of the time that the trigger began in the acoustic signal and based on a determination that input speech in the acoustic signal has ended. This server processes and interprets the user's acoustic input to the device 110 (i.e., the user's speech input) and generally provides a response to the device for presentation to the user. The presentation of the response may in the form of audio presented via a speaker 124 in the device.

One technical problem addressed by the user device 110 is limiting the amount of audio data sent to the server 190. It should be recognized that sending the audio data in a continuous manner may consume excessive communication resources as well as computation resources at the server required to process that data. By limiting the sending of audio data to time intervals associated with detection of a trigger, fewer communication and computation resources are consumed. It should also be recognized that in practice, the user device may make errors in detection of the trigger, with both missed actual triggers and false alarms of triggers that are not present. The quality of the user experience is improved when missed triggers are avoided. The amount of avoidable communication and server computation is reduced when false alarms are avoided. There may be a need to achieve low error rates within the computation resources available at the device.

The system 100 described below is an example of a system that provides an improved trigger detection error rate within a limited computation capacity (e.g., limits on the number of operations per second and/or the size of memory available to continuously process monitored audio) of the audio user interface device 110. Before addressing the technical features that yield this improvement, which is not merely an improvement achieved by virtue of applying computing resources to the problem, a description of the overall system is provided below.

Continuing to refer to the embodiment shown in FIG. 1, there are several stages of processing that ultimately yield a trigger detection, which in turn causes the device 110 to pass audio data to the server 190. The microphones 121 provide analog electrical signals that represent the acoustic signals acquired by the microphones. These electrical signals are time sampled and digitized (e.g., at a sampling rate of 20 kHz and 16 bits per sample) by analog-to-digital converters 122 (which may include associated amplifiers, filters, and the like used to process the analog electrical signals). As introduced above, the device 110 may also provide audio output, which is presented via a speaker 124. The analog electrical signal that drives the speaker is provided by a digital-to-analog converter 123, which receives as input time sampled digitized representations of the acoustic signal to be presented to the user. In general, acoustic coupling in the environment between the speaker 124 and the microphones 121 causes some of the output signal to feed back into the system in the audio input signals.

Figure 2A:
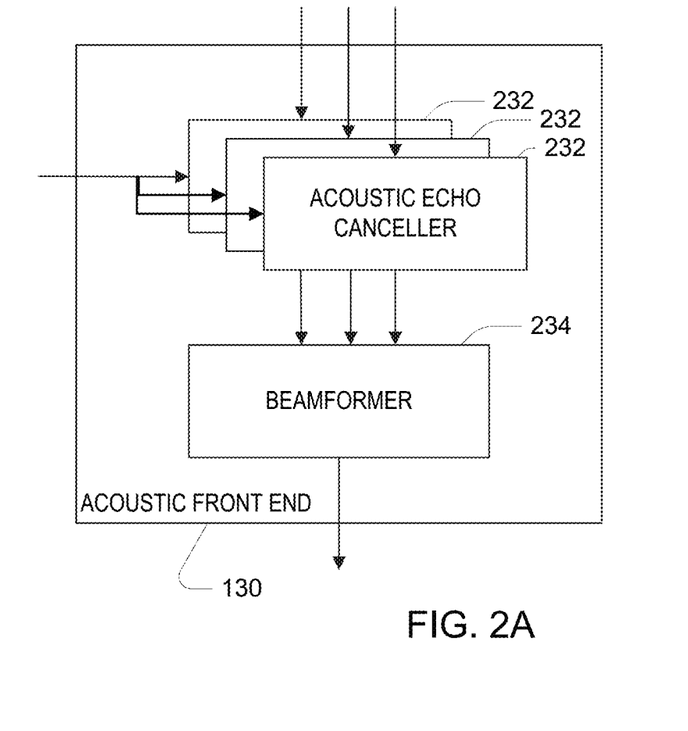
FIG. 2A is a block diagram of an acoustic front end (AFE).

An acoustic front end (AFE) 130 receives the digitized audio input signals and the digitized audio output signal, and outputs an enhanced digitized audio input signal (i.e., a time sampled waveform). Referring to FIG. 2A, an embodiment of the signal processor 130 includes multiple acoustic echo cancellers 232, one for each microphone, which track the characteristics of the acoustic coupling between the speaker 124 and each microphone 121 and effectively subtract components of the audio signals from the microphones that originate from the audio output signal. The acoustic front end 130 also includes a directional beamformer that targets a user by providing increased sensitivity to signals that originate from the user's direction as compared to other directions. One impact of such beamforming is reduction of the level of interfering signals that originate in other directions (e.g., measured as an increase in signal-to-noise ratio (SNR)).

In alternative embodiments, the acoustic front end 130 may include various features not described above, including one or more of: a microphone calibration section, which may reduce variability between microphones of different units; fixed beamformers, each with a fixed beam pattern from which a best beam is selected for processing; separate acoustic echo cancellers, each associated with a different beamformer; an analysis filterbank for separating the input into separate frequency bands, each of which may be processed, for example, with a band-specific echo canceller and beamformer, prior to resynthesis into a time domain signal; a dereverberation filter; an automatic gain control; and a double-talk detector.

Referring again to FIG. 1, a second stage of processing converts the digitized audio signal to a sequence of feature values, which may be assembled in feature vectors. A feature vector is a numerical vector (e.g., an array of numbers) that corresponds to a time (e.g., a vicinity of a time instant or a time interval) in the acoustic signal and characterizes the acoustic signal at that time. In the system shown in FIG. 1, a feature extractor 140 receives the digitized audio signal and produces one feature vector for each 10 milliseconds of the audio signal. In this embodiment, the element of each feature vector represents the logarithm of the energy in an audio frequency band ("log frequency band energies" LFBE), the frequency bands (e.g., frequency bands spaced uniformly in a Mel frequency scale) together spanning the typical frequency range of speech. Other embodiments may use other representations of the audio signal, for example, using Ceptral coefficients of Linear Prediction Coding (LPC) coefficients rather than LFBEs.

Figure 2B:
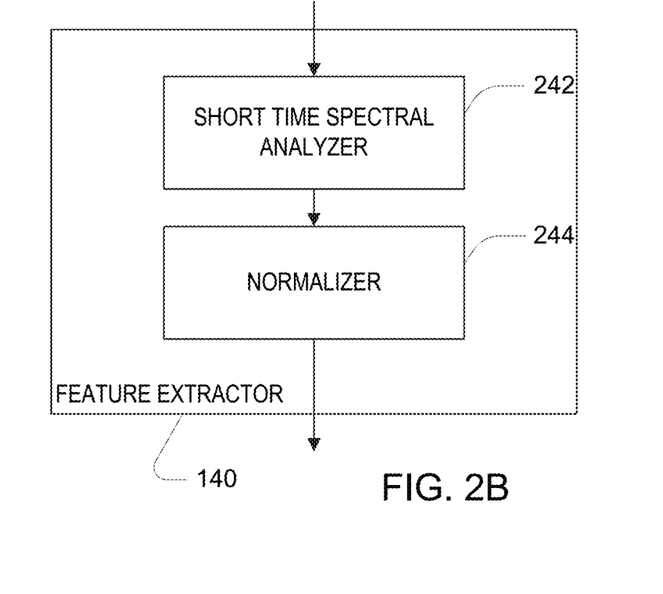
FIG. 2B is a block diagram of a feature extractor.

Referring to FIG. 2B, an embodiment of the feature extractor 140 includes a short time spectral analyzer 242, which accepts the audio signal, performs time windowing, Fourier analysis, and summation of energy over the ranges of the frequency bands. The output of the spectral analyzer 242 passes through a normalizer, which computes a decaying average of the computed feature vectors (optionally limiting the average over a period where substantially no input energy or speech-like input is received) and subtracting the average from the computed feature vectors to yield normalized feature vectors. Note that because the elements of the feature vectors in this embodiment are logarithms of energy, subtraction is effectively division in the linear energy domain. In some embodiments, the normalizer 244 also accumulates the standard deviation (square root of the variance) along with the average, and divides the elements of the feature vector with the goal of providing zero mean and unit variance elements in each dimension of the feature vectors.

Referring again to FIG. 1, the normalized feature vectors are provided to a feature analyzer 150, which generally transforms the feature vectors to a representation that is more directly associated with the linguistic content of the original audio signal. For example, in this embodiment, the output of the feature analyzer 150 is a sequence of observation vectors, where each entry in a vector is associated with a particular part of a linguistic unit, for example, part of an English phoneme. For example, the observation vector may include 3 entries for each phoneme of a trigger word (e.g., 3 outputs for each of 6 phonemes in a trigger word "Alexa") plus further related to non-trigger-word speech. As discussed in more detail below, this embodiment includes entries of the observation vector related to a full set of English language phonemes, which are used in the model of non-wakeword speech. In the embodiment shown in FIG. 1, feature vectors are provided to the feature analyzer 150 at a rate of one feature vector every 10 milliseconds, and an observation vector is provided as output at a rate of one observation vector every 10 milliseconds. In general, an observation vector produced by the feature analyzer 150 may depend on not only a current feature vector, but may also depend on a history of feature vectors.

Various forms of feature analyzer 150 may be used. One approach uses probability models with estimated parameters, for instance, Gaussian mixture models (GMMs) to perform the transformation from feature vectors to the representations of linguistic content. Another approach is to use an Artificial Neural Network (ANN) to perform this transformation. Within the general use of ANNs, particular types may be used including Recurrent Neural Networks (RNNs), Deep Neural Networks (DNNs), Time Delay Neural Networks (TDNNs), and so forth. Yet other parametric or non-parametric approaches may be used to implement this feature analysis.

Figure 2C:
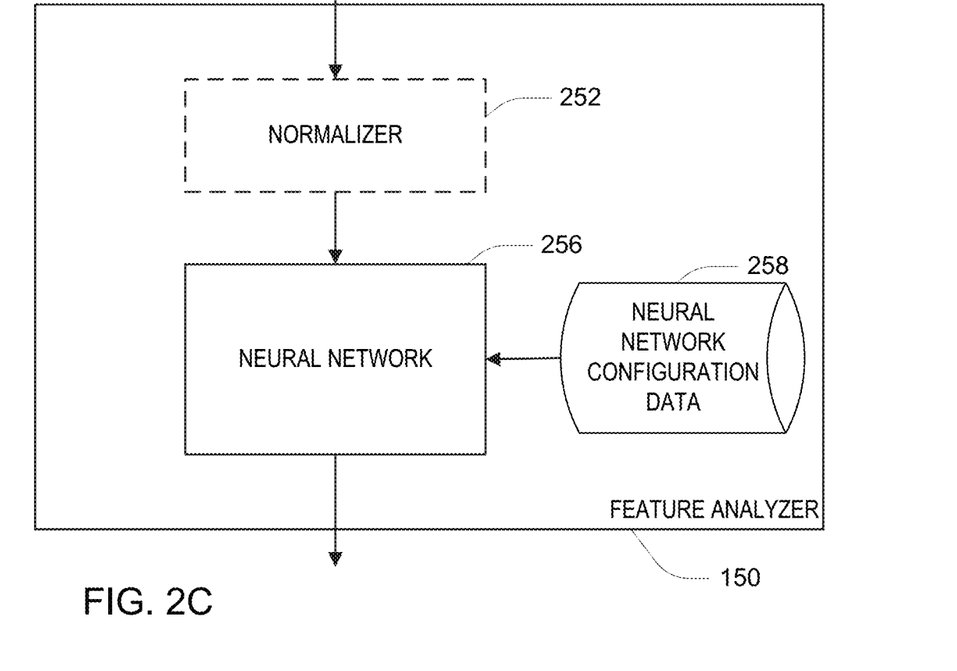
FIG. 2C is a block diagram of a feature analyzer.

Referring to FIG. 2C, the feature analyzer 150 of FIG. 1 may include an optional normalizer 252, which transforms each feature vector so that over time, the entries of the feature vectors have zero mean and unit variance. Each of these feature vectors are passed through an artificial neural network (ANN) 256 to produce the output of the feature analyzer 150 as the outputs of the neural network 256. For example a convolutional time-delay neural network (TDNN) is used. The neural network 256 is configured with configuration data 258, which includes parameters generally referred to as "weights" of the neural network. The configuration data may also include information governing the structure of the network, including the arrangement of nodes and links within a data flow graph representation of the neural network.

In the discussion below, the output of the feature analyzer, for the $t^{th}$ input (i.e., the $t^{th}$ observation vector $x_t$), $d_t$, is treated as representing "scaled likelihood" of each of the linguistic elements q (described in more detail below as states of a Hidden Markov Model) conditioned on that input. That is, the output of the neural network may provide a set of outputs that sum to 1.0 representing conditional probabilities, such that the $i^{th}$ output of the neural network represents the conditional probability $p(q_t=i|x_t)$, (using conventional notation the items to the right of the vertical bar "|" denotes the conditioning event and the notation p( ) is used without distinction for both probabilities of discrete events and probability density for continuous variable values). Prior to output, the feature analyzer scales each of these conditional probabilities by the unconditional probability of each element as $$d_{t,i}=p(q_t=i|x_t)/p(q_t=i),$$

which is referred to as a "scaled likelihood" because by Bayes Rule, this quantity is also equal to $$d_{t,i}=p(x_t|q_t=i)/p(x_t).$$

Figure 2D:
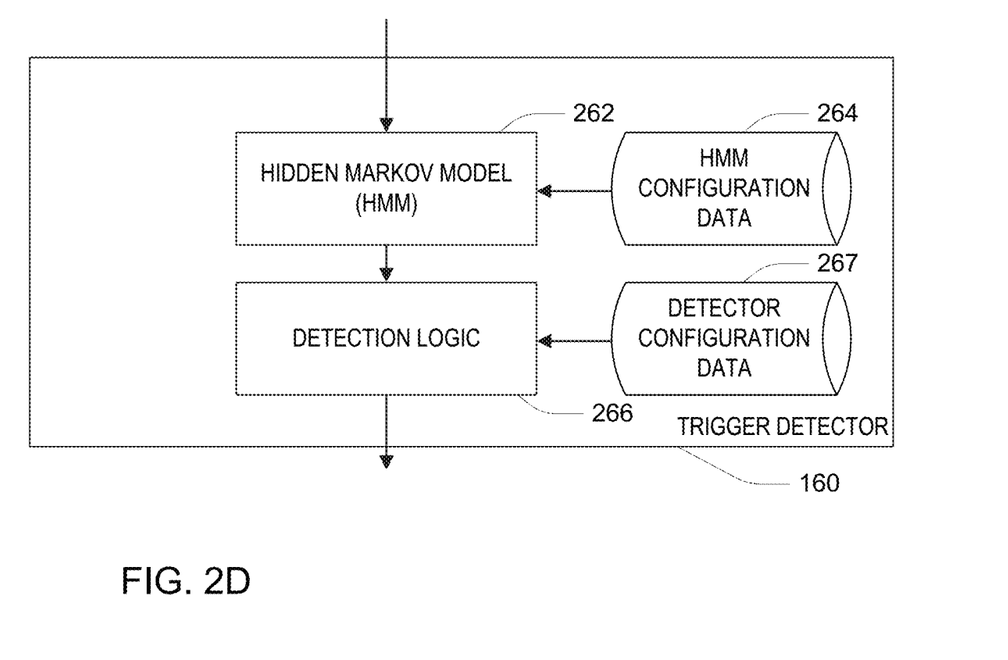
FIG. 2D is a block diagram of a trigger detector.

Referring to FIG. 2D, the outputs, $d_t$, of the feature analyzer 150 are provided to the trigger detector 160. Various types of trigger detectors may be used. One class of trigger detectors is configured to locate instances of a pattern in the successive sets of outputs of the feature analyzer 150. One specific type of such a sequential pattern detector uses a Hidden Markov Model (HMM). In this embodiment the trigger detector uses a Hidden Markov Model (HMM) module 262, and output of the HMM module 262 is provided to detection logic 266. The HMM module 262 is configured with HMM configuration data 264 and the detection logic 266 is configured with detector configuration data 267.

Before continuing with a description of components of the system 100 that make use of the output of the trigger detector 160 (see FIG. 1 and FIGS. 2E-F), a more detailed description related to the HMM 262 and detection logic 266 is provided below.

Figure 3:
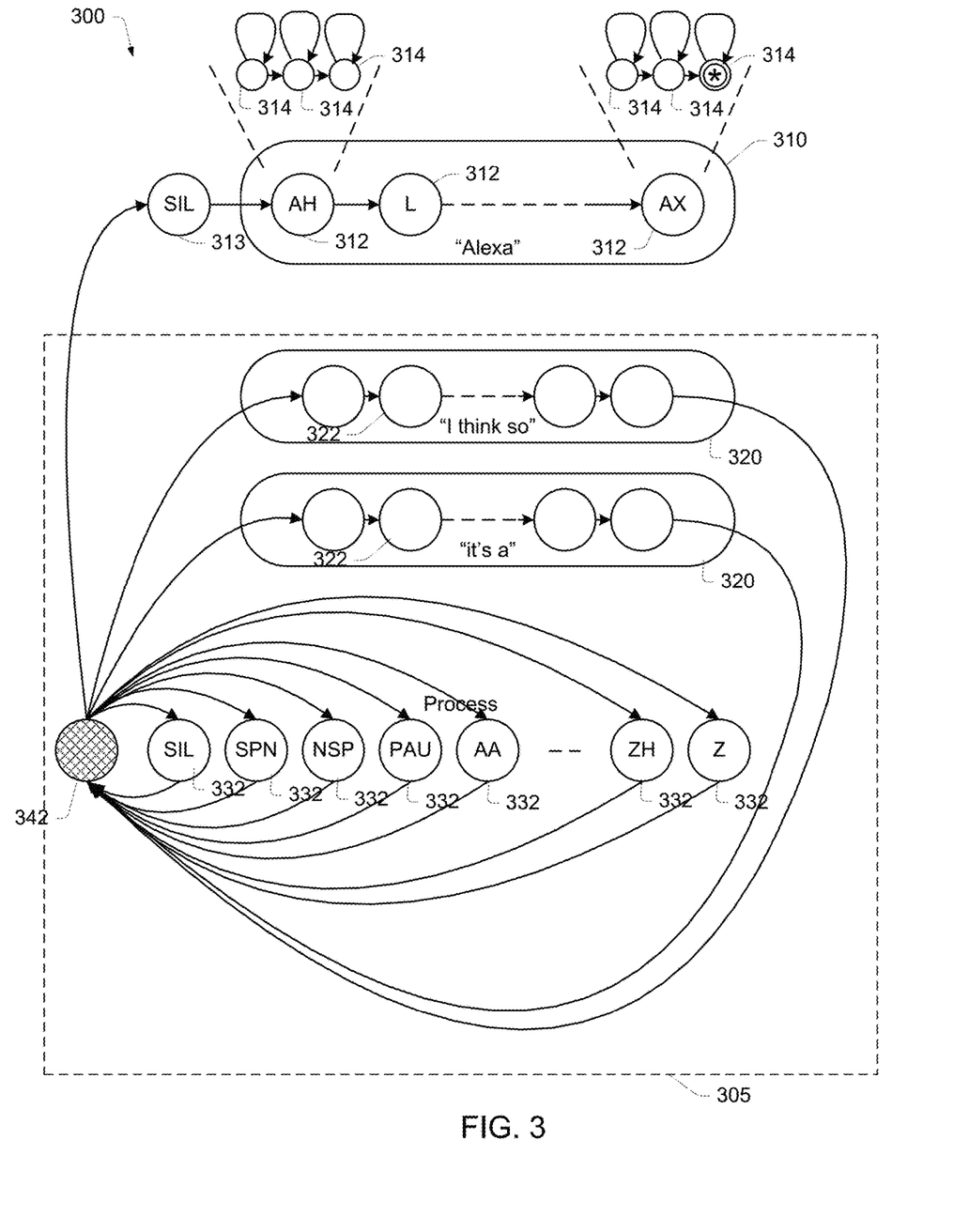
FIG. 3 is a representation of a Hidden Markov Model (HMM) state transition network.

Referring to FIG. 3, a Hidden Markov Model (HMM) has a state transition network 300, which includes a background model section 305 and a wakeword section 310. The wakeword section 310 includes a network of subword units 312, for example as illustrated, a "left-to-right" linear network representing the word "Alexa." It should be understood that more complex networks that account for alternative pronunciations may be used. Furthermore, although the term "wakeword" is used throughout this description, it would be understood that the "word" may be a multiple word phrase (e.g., "Hi Alexa"), and furthermore, the wakeword network may represent alternative word sequences (e.g., "Alexa," "Computer," "Hi Alexa," or "Hi Computer"). Each subword unit 312 is made up of a network of HMM states 314. In this example, each subword unit network has three states 314, arranged in a "left-to-right" network, which constrain the state sequence to have one or more occurrences of the "left" state, followed by one or more occurrences of the "center" state, followed by one or more occurrences of the "right" states (recognizing that in alternative embodiments, units may have only a single state or two states, or other topologies). In this description, the state at a particular time t is denoted $q_t$, and a capital Q is used to denote a sequence of states, for example, $Q=(q_1, \ldots, q_T)$ denotes a state sequence from time t=1 to time t=T. (Note that with reference to the HMM, "time" is measured as a count of the number of input feature vectors, in this embodiment corresponding to 10 millisecond units of the acquired acoustic signal). The network that is illustrated is parameterized with transition probabilities $$a = p(q_{t+1}=j|q_t=i),$$

where the lack of a link in the illustrated state transition diagram denotes that the corresponding state transition probability is zero.

In other embodiments, different type of networks for the subword units may be used, for example, with a different number of states, or with optional skipping of certain of the states. Furthermore, it is not required that all subword units in the network 300 have the same structure. The last state 315 of the last subword unit 312 of the wakeword 310, which is identified with an "*" in the Figure, represents the end of the wakeword. During processing, an end of an utterance of the wakeword corresponds to the MEW being that state. In the network 305 shown in FIG. 3, the wakeword 310 is required to be preceded by states of a "silence" state 313. That is, the system is configured to detect occurrences of the wakeword only when they follow a silence period as opposed to being embedded within an utterance.

The background model 305 of the network includes subword units 332 that together generally cover the sounds that occur in speech being processed by the system. In this embodiment, these units 332 generally correspond to English language phonemes, however other sets of linguistically motivated or non-linguistic data-derived units may be used. For linguistically motivated units, phonemes from other languages, or a set of language-independent phonemes covering many languages may be used. Other units such as diphones, syllables, demi-syllables, phoneme classes, etc. may also be used without altering the approach described below. Furthermore, the units themselves may be identified in an unsupervised manner by processing data, for example, using "fenones" or clustering of similar segments of speech. In FIG. 3, the network permits any sequence of the subword units 332. A "null" state 342 is included to allow transition via the null state without accounting for any input being processed by the HMM. That is, the null state 342 essentially provides a simplification of the connectivity of the states without having to explicitly enumerate all the possible state transitions. In this embodiment, the subword units includes 40 English phonemes, "AA" through "Z," as well as several additional units including "silence" (SIL), general speech (SPN), general non-speech (NSP), and interword pauses (PAU). Therefore, there are a total of 44 subword units 332.

The background model 305 optionally includes confusable words and phrases 320. If FIG. 3, two such confusable words or phrases 320 are shown: "I think so", and "it's a". Each of the confusable words or phrases 320 is made up of a network of subword units 322 representing the corresponding word or phrase. For example, the subword units 322 are English phonemes selected and arranged according to dictionary pronunciations of the words.

During operation, as presented above, the feature analyzer 150 provides successive scaled likelihoods $d_t$ to the HMM. The HMM implements "Viterbi" update procedure in which, for each successive update time t, and for all the states j, the quantities $v_{t,j}$ are updated as $$v_{t,j} = \max_i v_{t-1,i} a_{i,j} d_{t,j}$$
$$= \max_i v_{t-1,i} p(q_t = j \mid q_{t-1} = i) \frac{p(q_t = j \mid x_t)}{p(q_t)}$$

(suitably initializing $v_{1,j} = \pi_j d_{1,j}$ for initial probabilities $\pi_j$). As introduced above, the scaled likelihood is treated as being equivalent to $$d_{t,i} = P(x_t \mid q_t = i)/P(x_t)$$

and therefore following the properties of the Viterbi procedure (applying the conventional conditional independence assumption of the observation vectors), $$v_{t,j} = \max_{Q_1^t} p(X_1^t \mid Q_1^t) \bigg/ \prod_{\tau=1,\ldots,t} p(x_\tau),$$

where $X_1^t = (x_1, \ldots x_t)$, and $Q_1^t = (q_1, \ldots, q_{t-1}, q_t=j)$ is a state sequence ending in state j at time t. Treating $$p(X_1^t) = \Pi \tau p(x_\tau)$$

(i.e., treating the observation vectors as independent, which is recognized to be incorrect), it is useful to consider $v_{t,i}$ to be $$v_{t,i} \approx \max_{Q_1^t} p(X_1^t \mid Q_1^t)/p(X_1^t) = \max_{Q_1^t} p(Q_1^t \mid X_1^t)/p(Q_1^t)$$

Figure 2E:
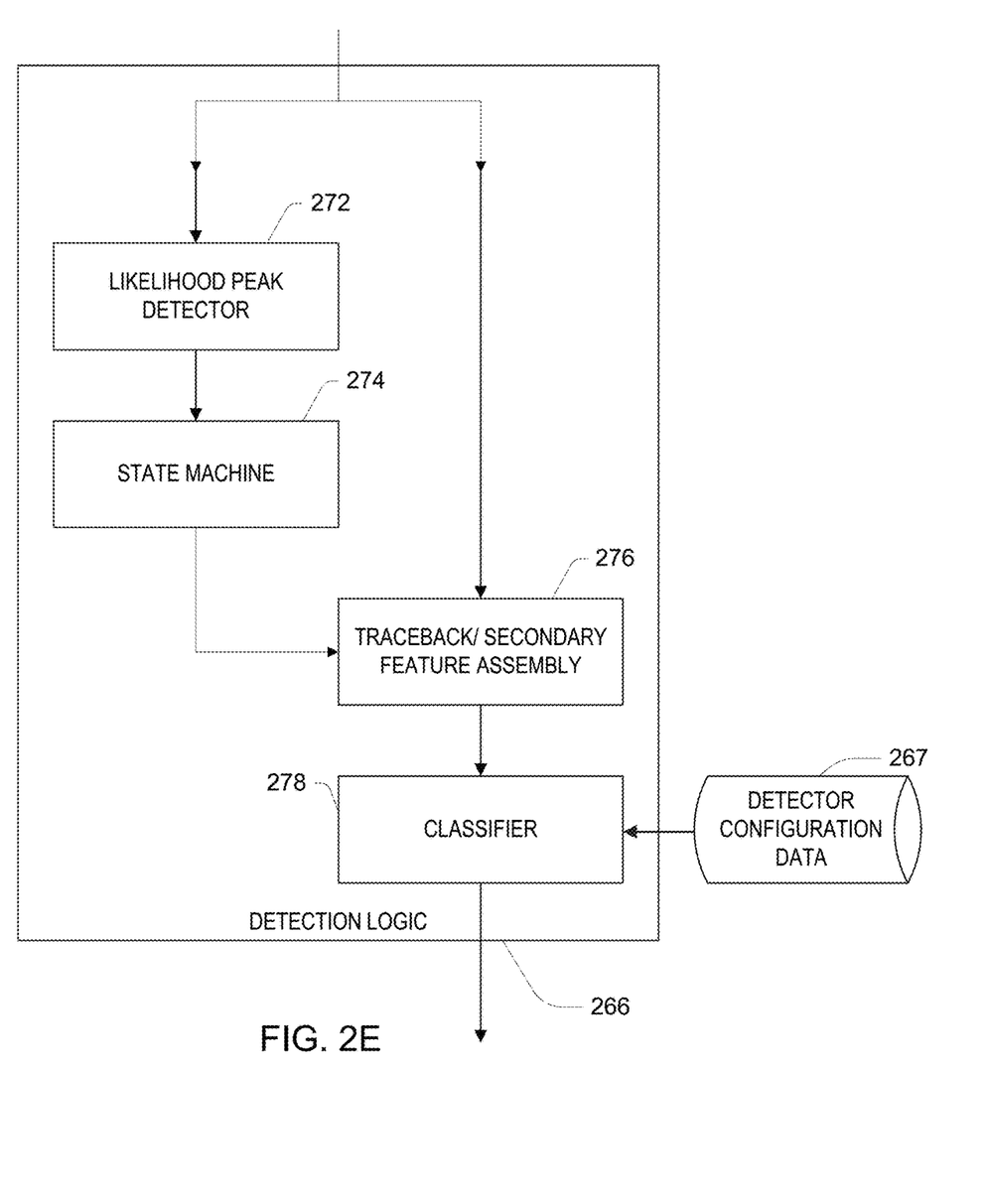
FIG. 2E is a block diagram of detection logic.

As introduced above, a particular state, denoted q* is the last state of the wakeword, and an output of the HMM that is used for detecting the presence of the wakeword ending at a particular time is the time evolution of the quantity $$s(t) = v_{t,q^*}$$

as defined above, or a scaled version and/or log version of this quantity. Local peaks in this score are used to locate potential ending times of the wakeword in a likelihood peak detector 272 shown in FIG. 2E. To avoid prematurely declaring a local peak, the peak detector implements a window-based approach in which the local peak must be the highest within a fixed window length, and further declaration of ending times are inhibited for a period of time after a peak is detected in the window.

During the Viterbi update procedure, states that maximize each of the updates for the $v_{t,j}$ terms are retained in a "traceback" data structure, and therefore having declared that the last state is q* (also referred to herein as $q_{end}$) at an end time $t_{end}$, the corresponding state sequence $Q_1^{t_{end}} = (q_1, \ldots, q_{t-1}, q_{t_{end}} = q_{end})$ is available via the traceback structure maintained during the Viterbi procedure. In particular, the first time the state sequence enters the first state associated with the wakeword is thereby determined at $t_{start}$ such that $q_{t_{start}} = q_{start}$, which is the first state of the silence unit preceding the wakeword. Furthermore, times spent in each of the subword units of the wakeword are also available via the traceback structure. In this example in which the wakeword is associated with a preceding silence unit and has six subword units, there are seven corresponding time segments, each with a starting time and an ending time.

For the selected wakeword ending time $t_{end}$, the state subsequence from $t_{start}$ to $t_{end}$ is referred to as a time segment, denoted "seg", for the wakeword and is denoted $Q_{KW}$. For the same ending time, the state q in the background model with the highest Viterbi value $v_{t_{end},q}$ yields a best subsequence $Q_{BG}$ from $t_{start}$ to $t_{end}$ ending at that background state. Various features are computed for the wakeword time segment by the traceback and secondary feature assembly component 276 shown in FIG. 2E. To distinguish from other "features", these features are referred to as the wakeword feature vector. This wakeword feature vector is used in a further classification stage described in more detail below.

A total duration for the wakeword segment is one element (i.e., a feature) of the wakeword feature vector and is computed as $$\text{Dur}_{seg} = t_{end} - t_{start} + 1.$$

Another wakeword feature is a total score of the segment, computed based on the Viterbi procedure as $$\text{Score}_{seg} = \prod_{t=t_{start}}^{t_{end}} \frac{p(q_t \mid x_t)}{p(q_t)} \prod_{t=t_{start}+1}^{t_{end}} a_{q_{t-1},q_t}$$

for the state sequence $Q_{KW}$, which is treated as $$\text{Score}_{seg} \approx p(X \mid Q_{KW})/p(X)$$

where $X = (x_{t_{start}}, \ldots, x_{t_{end}})$.
start end

Another wakeword feature is an average score computed as $$\text{AveScore}_{seg} = \text{Score}_{seg}/\text{Dur}_{seg}.$$

Another wakeword feature is a confidence of the segment, which compares the scaled likelihoods along the path in the wakeword part of the HMM and the background part of the HMM. In particular, this feature is computed as $$\text{Conf}_{seg} = \frac{p(X \mid Q_{KW})}{p(X \mid Q_{KW}) + p(X \mid Q_{BG})}.$$

In addition to these four features for the wakeword segment as a whole, a set of features are computed for the subword unit segments of the wakeword. Quantities for a particular subword unit (i.e., phoneme) segment p are denoted by the subscript p.

A total duration $\text{Dur}_p$ is computed corresponding to the number sequential states in $Q_{KW}$ are in that segment, computed as $$\text{Dur}_p = T_{p+1} - T_p$$

where $T_p$ is the starting time of the $p^{th}$ segment (and $T_{P+1}$ is treated as being equal to $t_{end} + 1$).

A relative duration is computed as the fractional time in the segment as compared to the duration of the wakeword as a whole, computed as $$\text{RelDur}_p = \text{Dur}_p/\text{Dur}_{seg}.$$

A confidence of the subword segment is defined as the average ratio between the wakeword state likelihood and the sum of the likelihoods from all the background states, defined as $$\text{Conf}_p = \frac{1}{\text{Dur}_p} \sum_{t=T_p}^{T_{p+1}-1} \frac{d_{t,q_t}}{\text{backgroundScore}(t)}$$

where $q_t \in Q_{KW}$ is the state in the sequence $Q_{KW}$ at time t, and where $$\text{backgroundScore}(x_t) = \sum_{q_b \in \text{background}} d_{t,q_b}.$$

A speech confidence for this time segment is computed as $$\text{SpeechConf}_p = \frac{1}{\text{Dur}_p} \sum_{t=T_p}^{T_{p+1}-1} \frac{\sum_{q_b \in \text{background} \setminus \text{NSP}} d_{t,q_b}}{\sum_{q_b \in \text{background}} d_{t,q_b}}$$

$$= \frac{1}{\text{Dur}_p} \sum_{t=T_p}^{T_{p+1}-1} \left(1 - \frac{d_{t,\text{NSP}}}{\text{backgroundScore}(t)}\right)$$

where "background\NSP" represents all states of the background model with the omission of the non-speech unit, which is labelled "NSP".

An number of phone confidence scores are computed making use of an maximum score phone score defined as $$\text{maxscore}(t, p) = \max_{q \in \{q_p^l, q_p^c, q_p^r\}} d_{t,q}$$

where $q_p^l$ is defined as the first (left) of the three states for the $p^{th}$ subword unit in the wakeword, $q_p^c$ and $q_p^r$ are similarly defined for the second (center) and third (right) states. Using this definition, the left, center, and right confidence scores are defined as $$LPhConf_p = \frac{1}{Dur_p} \sum_{t=T_p}^{T_{p+1}-1} \frac{\text{maxscore}(t, p-1)}{backgroundScore(t)}, \text{ for}$$

$p = 2, \ldots, P$, $$CPhConf_p = \frac{1}{Dur_p} \sum_{t=T_p}^{T_{p+1}-1} \frac{\text{maxscore}(t, p)}{backgroundScore(t)}, \text{ for}$$

$p = 1, \ldots, P$, and $$RPhConf_p = \frac{1}{Dur_p} \sum_{t=T_p}^{T_{p+1}-1} \frac{\text{maxscore}(t, p+1)}{backgroundScore(t)}, \text{ for}$$

$p = 1, \ldots, P-1$

Finally, a set of entropies derived from the confidence scores are computed using three-bin distributions, as $$\text{entropy}(a_l, a_c, a_r) = \frac{1}{\log 3}\left(\frac{a_l}{A}\log\left(\frac{a_l}{A}\right) + \frac{a_c}{A}\log\left(\frac{a_c}{A}\right) + \frac{a_r}{A}\log\left(\frac{a_r}{A}\right)\right),$$

where $A = a_l + a_c + a_r$. This quantity provides a measure of variation over the distribution.
The two features are WithinSlotNormEntropy$_p$=entropy(LPhConf$_p$, CPhConf$_p$,RPhConf$_p$), for p=1, . . . , P and AcrossSlotNormEntropy$_p$=entropy(RPhConf$_{p-1}$, CPhConf$_p$,LPhConf$_{p+1}$), for p=1, . . . , P, padding the missing values at p=1 and p=P with zeroes. This latter quantity provides a measure of variation of a match of the input data for the $p^{th}$ unit over multiple of the subword units (i.e., p−1 through p+1) of the event.

Finally, for each combination of a wakeword subword segment p, and a background subword unit b, which has left, center, and right states $\{q_b^l, q_b^c, q_b^r\}$, a match score $$MatchScore_{p,b} = \frac{1}{Dur_p} \sum_{t=T_p}^{T_{p+1}-1} \log \text{maxscore}_{BG}(x_t, b)$$

is computed where maxscore$_{BG}$ is defined analogously to the maxscore for within wakeword evaluation used above for each of the 44 background units.

Therefore, with P=7 wakeword subword units, and B=44 units it the background model (excluding the non-speech unit), the total number of features computed for a particular wakeword ending time are:

4Dur$_{seg}$,Score$_{seg}$,AveScore$_{seg}$,Conf$_{seg}$

Figure 4:
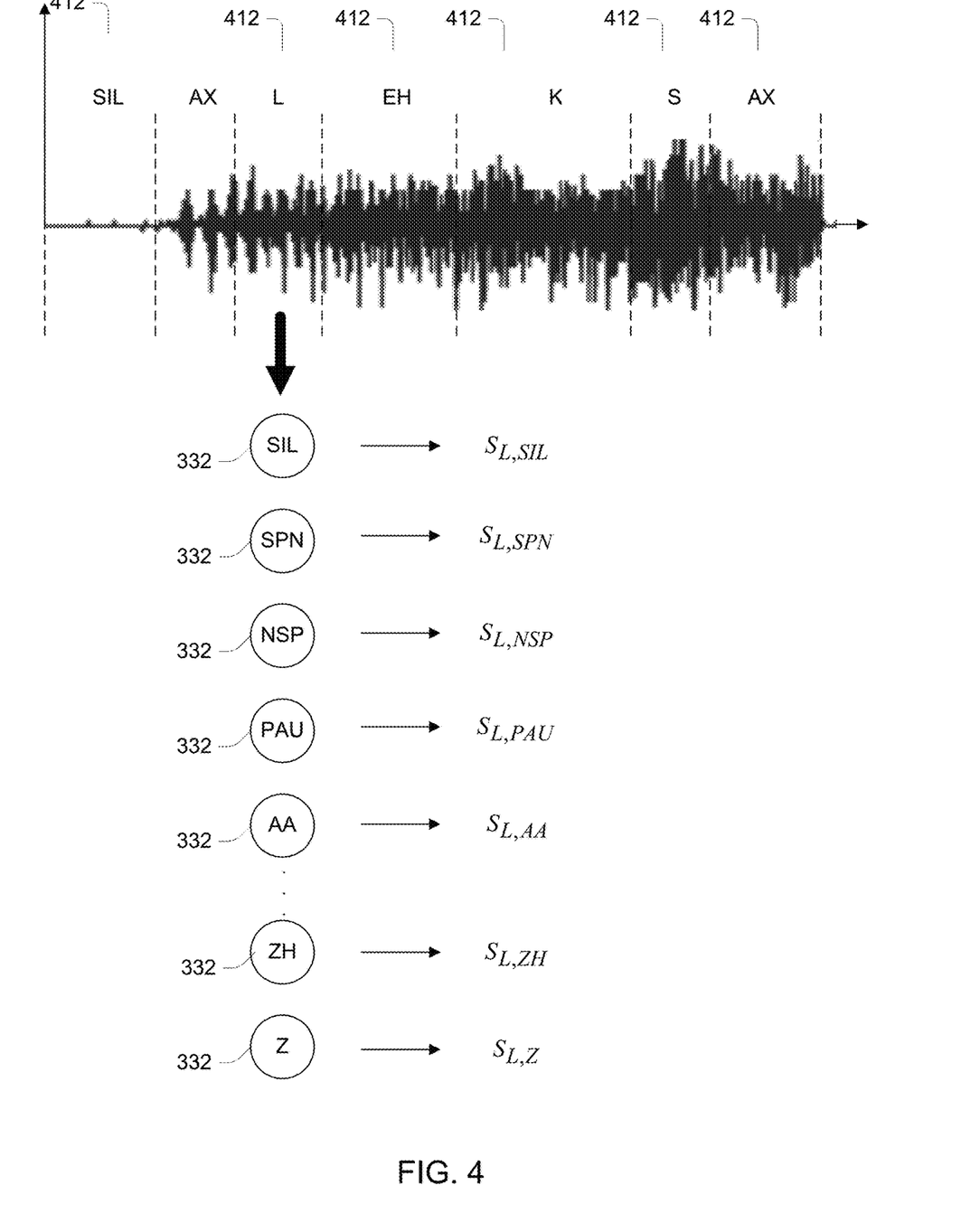
FIG. 4 is an illustration of a procedure for determining background unit classifier inputs.

P*6Dur$_p$,RelDur$_p$,SpeechConf$_p$,CPhConf$_p$, AcrossSlotNormEntropy WithinSlotNormEntropy (P−1)*2LPhConf$_p$,RPhConf$_p$,(P*B)MatchScore for a total of 373 values. Referring to FIG. 4, the process of segmentation of the wakeword, as well is illustrated in the top portion of the diagram. Each subword unit segment has a located extent 412 (e.g., a particular sequence of input feature vectors of length Dur$_p$ for segment p as described above, corresponding to a time interval in the acoustic signal acquired by the microphone) generates a number of feature values as described above (e.g., Dur$_p$, RelDur$_p$, SpeechConf$_p$, etc.) and each segment is compared against each of the background units 322 (i.e., generating the MatchScore values, denote S in the figure).

Generally, the secondary classifier 278 receives these various computed quantities corresponding to the trigger word ending time and performs a scoring or detection decision based on the inputs. The operation of the classifier depends on values of parameters stored in the detector configuration data 267. In some embodiments, the classifier is implemented using a Support Vector Machine (SVM). The detector logic receives the wakeword feature vector v, and computes a quantity v·a+b, where a and b are parameters that have set values, and compares it with zero, such that if the quantity is greater than zero, the wakeword is treated as having occurred, and if the quantity is not greater than zero, the detected occurrence of the wakeword is treated as a "false alarm" and discarded. In some examples, the SVM makes use of radial basis functions to augment the feature vector.

Referring back to FIG. 1, assuming the detected occurrence passes the SVM classification stage, the communication interface receives an indicator part of the input (e.g., the frame number or time) corresponding to the identified trigger. Based on this identified part of the input, the communication interface 170 selects the part of the audio data (e.g., the sampled waveform) to send to the server 190. In some embodiments, this part that is sent starts at the beginning of the trigger, and continues until no more speech is detected in the input, presumably because the user has stopped speaking. In other embodiments, the part corresponding to the trigger is omitted from the part that is transmitted to the server. However, in general, the time interval corresponding to the auio data that is transmitted to the server depends on the time interval corresponding to the detection of the trigger (e.g., the trigger starts the interval, ends the interval, or is present within the interval).

Figure 5:
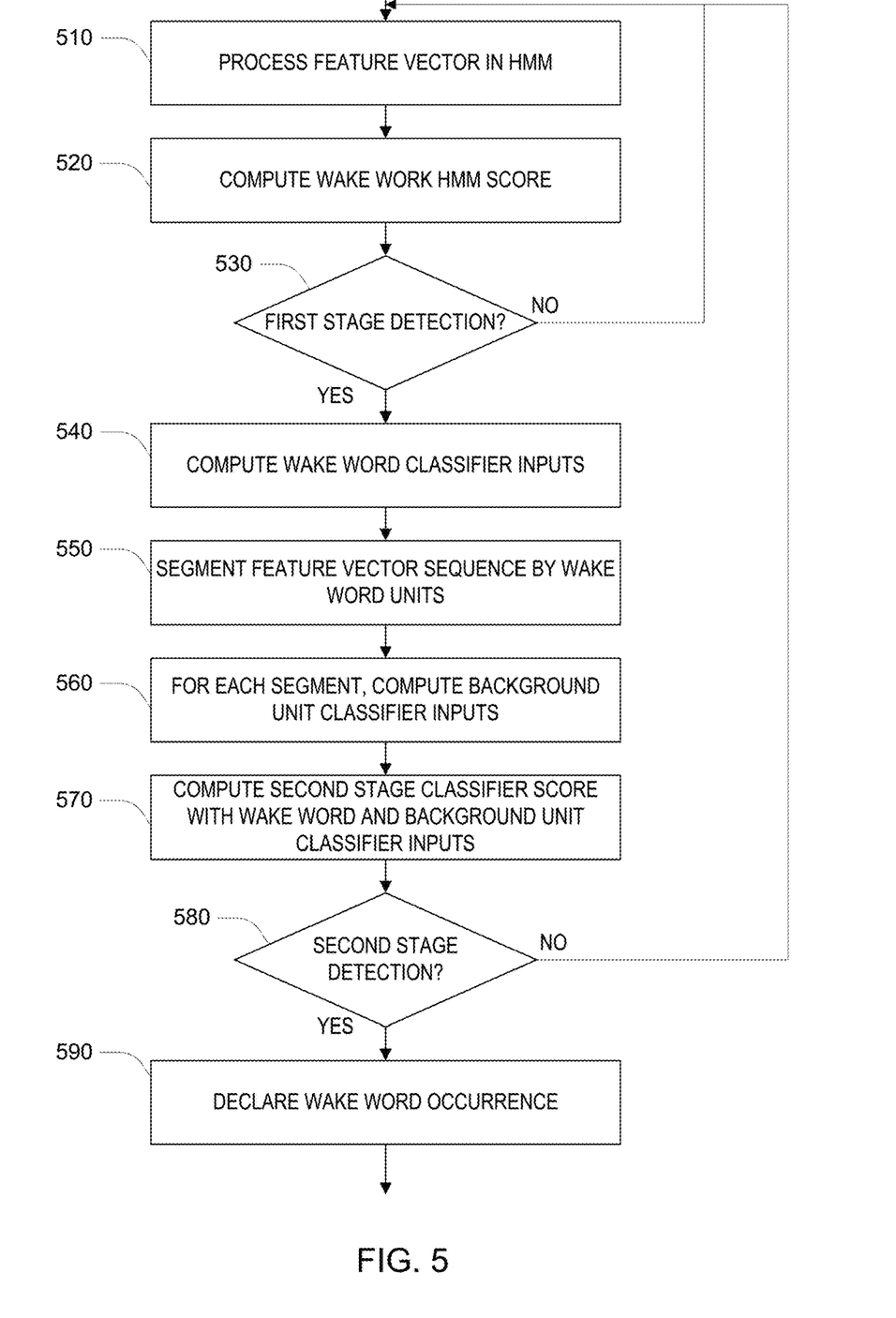
FIG. 5 is a flowchart for detecting a wakeword.

Referring to FIG. 5, the process described above can be summarized in the flowchart in the Figure. At step 510, for each input frame, the HMM processes the feature vector output of the neural network. At step 520, the end-of-wakeword score is computed, and at test 530, if a suitable local maximum is detected in the score, a first stage detection is declared. At step 540, the whole-wakeword ("seg") features are computed. At step 550, the features of the subword wakeword units are computed, and then at step 560, the match scores with each of the background units are computed. At step 570, the SVM classification is performed, and if the output is consistent with a true wakeword (e.g., the SVM output is positive) at step 580 the wakeword is declared to have occurred (step 590).

Referring back to FIG. 2F processing at the spoken language server 190 may include various configurations for processing the acoustic data (e.g., the sampled audio waveform) received from the audio interface device 110. For example, a runtime speech recognizer 281 uses an acoustic front end 282 to determine feature vectors from the audio data. These may be the same feature vectors computed at the interface device 110, or may be a different representation of the audio data (e.g., different numbers of features, different number per unit time, etc.). A speech recognition engine 284 processes the feature vectors to determine the words in the audio data. Generally, the speech recognizer 281 attempts to match received feature vectors to language phonemes and words as known in the stored acoustic models 283 and language models 285. The speech recognition engine 284 computes recognition scores for the feature vectors based on acoustic information and language information and provides text as output. The speech recognition engine 284 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Figure 2F:
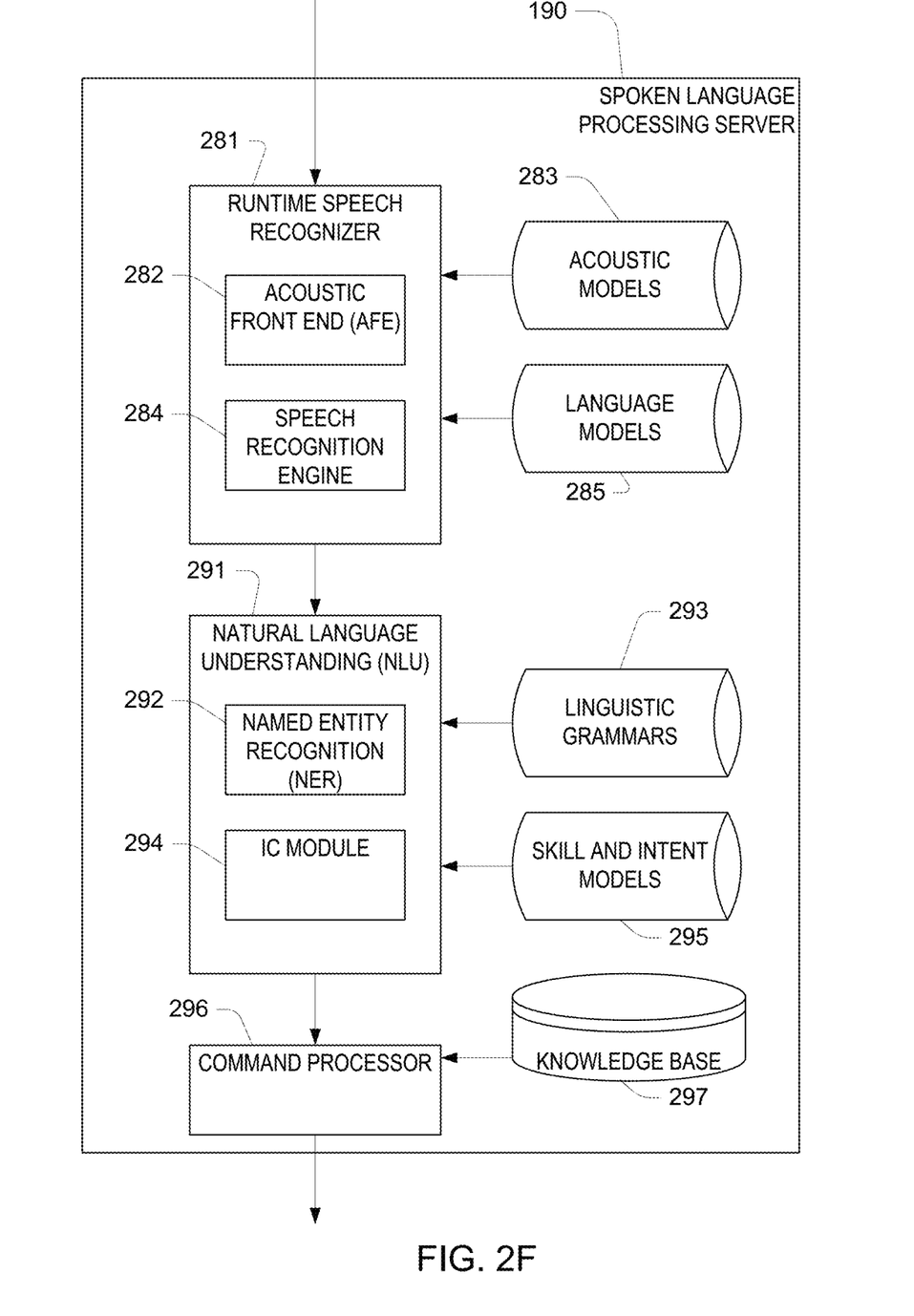
FIG. 2F is a block diagram of a spoken language processing server.

Following processing by the runtime speech recognizer 281, the text-based results may be sent to other processing components, which may be local to the device performing speech recognition and/or distributed across data networks. For example, speech recognition results in the form of a single textual representation of the speech, an N-best list including multiple hypotheses and respective scores, lattice, etc. may be sent to a natural language understanding (NLU) component 291 may include a named entity recognition (NER) module 292, which is used to identify portions of text that correspond to a named entity that may be recognizable by the system. An intent classifier (IC) module 294 may be used to determine the intent represented in the recognized text. Processing by the NLU component may be configured according to linguistic grammars 293 and/or skill and intent models 295. After natural language interpretation, a command processor 296, which may access a knowledge base 297, acts on the recognized text. For example, the result of the processing causes an appropriate output to be sent back to the user interface device for presentation to the user.

The description above focuses on the runtime operation of the audio interface device 110 shown in FIG. 1. As described above, the device 110 is configured with various data, including the neural network configuration data 258, the HMM configuration data 264, and the detector configuration data 267. In general, the configuration data for the device 110 is computed on a data processing system that is separate from the device 110 based on representative input that includes examples of the trigger word to be detected. The configuration data may be loaded into the device before deployment or downloaded to the device 110 from time to time from a server.

Generally, neural network weights and the HMM parameters (e.g., the transition probabilities) are determined together in a "training" procedure which uses data representing a set of audio recording which have been annotate (e.g., transcribed) to indicate occurrences of the wakeword as well as other words in the general vocabulary. Generally, the procedure alternates between associating each input feature vector obtained from the audio recordings with a state (or a state distribution) based on current weights of the neural network and the HMM parameters, and updating the weights of the neural network using an incremental gradient-based optimization procedure generally referred to as "back-propagation," as well as updating the transition probabilities.

In this embodiment, the neural network weights are determined to optimize a cross-entropy loss function, thereby essentially achieving Maximum Likelihood training of the HMM. Other approaches to training the neural network may be used, including approaches that use different loss functions, and approaches that attempt to discriminate accurately between true wakeword occurrences and false alarms.

Generally, the detection logic is addressed in training by determining the values of configuration parameters for the SVM (i.e., a and b) based on detected true and false alarms on a training data set of recorded utterances that are labelled as to having a wakeword or not.

It should be understood that the specific arrangement of the background HMM and the elements of the wakeword feature vector described for the embodiment above may be varied without departing from the general approach. For example, different features of subword units of the wakeword may be used, for example, various average, variation, or maximum scores in each segment, may be used, and difference comparisons of the wakeword subword units and the background subword units may be used, for example, comparing each wakeword subunit against particular subsets of background units. In some examples, the background model may include explicit inter-phoneme transition probabilities (e.g., a phoneme "bigram" model).

In some embodiments, the parameters of the classifier (e.g., the SVM classifier, or an alternative parametric classifier) are training jointly with the parameters of the HMM. For example, a joint gradient-based approach is used such that the training labels for the classifier are propagated through the classifier structure according to the derivatives of the classifier features and to the neural network that provides the state scores for the HMM. In some examples of this approach, alternating stages of computation of a state alignment and training of classifier and HMM parameters are performed.

In yet another embodiment, the structure of the input features (e.g., their functional forms) for the classifier are not necessarily provide and are rather learned from data. For example, a rich set of features based on the alignment of the located instance of the wakeword to subword units of the wakeword and to subword units of the background are provide to a secondary scoring neural network, which is trained independently or jointly with the HMM and its neural network.

In the description above, the wakeword is predefined in the sense that that structure of the HMM is known when the particular utterance is processed by the system. However, it should be understood that such predefinition of the wakeword is not limited to an initial configuration of the interface device. For example, the wakeword may be set by the user, or even determined implicitly from a prior input from the user.

In alternative versions, the predefined event that is being detected is not necessarily word based. For example, a clap, door slam, or other non-linguistic event may be detected using the same approach. Similarly, the sub-units are not necessarily subword units. For example, the sub-units may represent clustered acoustic-based patterns that are found in collected input data.

The use of an HMM, or more particularly, use of a Viterbi scoring procedure, is not essential. For example, other forms of processing based on models that impose at least some deterministic or probabilistic sequence constraint on sub-units located in the input data may be used. Similarly, it is not essential to use an SVM, as other parametric or non-parametric classifiers may be using, including neural networks, or nearest neighbor approaches.

The approaches described above may be implemented in software, in hardware, or using a combination of software and hardware. For example, the software may include instructions stored on a non-transitory machine readable medium that when executed by a processor, for example in the user interface device, perform some or all of the procedures described above. Hardware may include special purpose circuitry (e.g., Application Specific Integrated Circuits (ASICs), Field Programmable Gate Arrays (FPGAs) and the like) for performing some of the functions. For example, some of the computations for the neural network transformations may be implemented using such special purpose circuitry.

It is to be understood that the foregoing description is intended to illustrate and not to limit the scope of the invention, which is defined by the scope of the appended claims. Other embodiments are within the scope of the following claims.

What is claimed is:

1. A method for processing an audio signal, the method comprising:
   receiving input data representing an audio signal acquired by a microphone in an acoustic environment, the audio signal including a speech signal;
   processing the input data in a first stage of processing to identify a possible occurrence of the predefined word-based event, the processing including:
   determining a time-based extent of the occurrence in the input data; and
   locating a plurality of segments of the predefined word-based event, each segment corresponding to a particular sub-word unit of the predefined event and to a corresponding time-based extent of the sub-word unit in the input data;
   determining values of a plurality of features for input to a second stage of processing, the values for input to the second stage of processing including (a) whole word values of features associated with the extent of the occurrence of the predefined word-based event and (b) for each sub-word unit of multiple of the sub-word units of the word-based event, sub-word values of features associated with the time-based extent of the respective each sub-word unit for the word-based event, wherein the values of the features associated with the time-based extent include at least one value corresponding both to the sub-word unit of the predefined event and to a sub-word unit not associated with the predefined word-based event;
   classifying, in the second stage of processing, based on the whole word values and the sub-word values as inputs to the second stage of processing, the possible occurrence of the predefined word-based event as either a true occurrence or a false occurrence by processing the values of the plurality of features; and
   when the possible occurrence is classified as a true occurrence, triggering the operation of the user interface, including triggering further processing of the input data to control operation of a speech-enabled system according to linguistic input represented in the input data,
   wherein a time-based extent corresponds to a time interval in the audio signal acquired by the microphone.

2. The method of claim 1, wherein processing the input in the first stage includes processing the input data using a Hidden Markov Model (HMM) that has a first part corresponding to the word-based event and a second part corresponding to input data that does not correspond to the word-based event.

3. The method of claim 2, wherein the first part of the HMM includes the sub-word units of the word-based event and the second part of the HMM includes the sub-word units not associated with the word-based event and wherein the sub-word units of the first part and the second part of the HMM comprise phonetically-based units.

4. The method of claim 2, wherein determining the values of the plurality of features includes, for one or more sub-word units of the word-based event, one or more features associated with the located extent of the sub-word unit in the input data and wherein the one or more features associated with the extent of the sub-word unit include a plurality of features, each feature corresponding to a different sub-word unit not associated with the predefined event.

5. A method for processing an audio signal, the method comprising:
   receiving input data representing an audio signal generated by a microphone in an acoustic environment, the audio signal including a speech signal;
   processing the input data to identify a possible occurrence of the predefined event, including locating a time-based extent of the occurrence in the input data, the processing including locating a plurality of segments of the predefined event, each segment corresponding to a particular sub-unit of the predefined event and to a corresponding time-based extent in the input data;
   determining values of a plurality of features for input to a second stage of processing, the values including (a) whole event values of features associated with the time-based extent of the predefined event, and (b) for each sub-unit of multiple of the sub-units of the predefined event, subunit values of features associated with the time-based extent of the sub-unit, wherein the values of the features associated with the located time-based extent of a sub-unit including at least one value corresponding to both the sub-unit of the predefined event and a sub-unit not associated with the predefined event;
   classifying, in the second stage of processing, based on the whole event values and the subunit values as inputs to the second stage of processing, the possible occurrence of the predefined event as either a true occurrence or a false occurrence by processing the values of the plurality of features; and
   processing of input representing audio data generated by the microphone to control operation of a speech-enabled system according to linguistic input represented in the input data,
   wherein a time-based extent corresponds to a time interval in the audio signal acquired by the microphone.

6. The method of claim 5, wherein processing the input data includes processing the input data using a model that imposes a sequence constraint on sub-units and that has a first part corresponding to the event and a second part corresponding to input data that does not correspond to the event.

7. The method of claim 6, wherein the first part of the model includes the sub-units of the event and the second part of the model includes the sub-units not associated with the event.

8. The method of claim 6, wherein determining the values of the plurality of features includes, for one or more sub-units of the predefined event, one or more features associated with the extent of the sub-unit in the input data.

9. The method of claim 8, wherein the features associated with the extent of the sub-unit include at least two features from a group consisting of:
a duration of the located extent;
a relative duration of the located extent of the sub-unit as comparted to duration of the located extent of the event;
a score characterizing a match of the located extent of the input data and parameters representing the sub-unit; and
an average score characterizing a match of the located extent of the input data and parameters representing the sub-unit.

10. The method of claim 8, wherein the features associated with the located extent of the sub-unit includes: a quantity depending on a match of the located extent of the input data and parameters representing the sub-unit of the event, and a match of the located extent of the input data and parameters representing another sub-unit of the event.

11. The method of claim 10, wherein said quantity comprises a measure of variation of a match of the located extent of the input data over multiple of the sub-units of the event.

12. The method of claim 8, wherein the features associated with the located extent of the sub-unit includes: a quantity depending on a match of the located extent of the input data and parameters representing the sub-unit of the event, and a match of the located extent of the input data and parameters representing a sub-unit not corresponding to the event.

13. The method of claim 5, wherein classifying the possible occurrence includes processing the values of the plurality of features using a parametric classifier.

14. The method of claim 13, wherein processing the values of the plurality of features using the parametric classifier comprises: processing the values of the plurality of features using a Support Vector Machine (SVM) to compute a quantity according to $v*a+b$, where v is a vector representation of the values of the plurality of features and where a and b are parameters that have set values and comparing the computed quantity to 0 such that if the quantity is greater than 0 the predefined event is treated as having occurred and if the quantity is not greater than 0 the detected occurrence of the pre-defined event is treated as a false alarm.

15. The method of claim 14, wherein the SVM uses radial basis functions to augment the vector v.

16. The method of claim 13, wherein classifying the possible occurrence of the predefined event comprises using the parametric classifier configured with classifier configuration data having been determined from data labelled with true occurrences of the predefined event.

17. The method of claim 16, wherein processing the input data to identify the possible occurrence of the predefined event includes using a parameterized recognizer prior to the second stage, the parameterized recognizer being configured with recognizer configuration data, the recognizer configuration data and the classifier configuration data having been determined jointly from the data labelled with the true occurrences.

18. The method of claim 5, wherein the predefined event is represented as a sequence of sub-units, wherein each sub-unit is represented as a sequence of different parts of the sub-unit, and wherein processing the input data to identify the possible occurrence of the predefined event includes, in a first stage prior to the second stage, computing scores characterizing a match of the input data to respective different parts of the sub-units of the predefined event.

19. The method of claim 18, wherein determining the values of the plurality of features comprises computing at least one feature that represents a variation of the score or a quantity determined for the respective parts of the sub-units from the score among different parts of one sub-unit of the predefined event and computing at least another feature representing a variation of the score or a quantity determined for the respective parts of the sub-units from the score among parts of two successive sub-units of the predefined event.

20. A non-transitory machine-readable medium comprising instructions stored thereon, wherein execution of the instructions by a process of an audio user interface device includes determining presence of a predefined event in input data representing an acoustic signal acquired by the device in a user environment, wherein determining the presence comprises:
receiving input data representing an audio signal generated by a microphone in an acoustic environment, the audio signal including a speech signal;
processing the input data representing an audio signal acquired by a microphone to identify a possible occurrence of the predefined event, including locating a time-based extent of the occurrence in the input data, the processing including locating a plurality of segments of the predefined event, each segment corresponding to a particular a sub-units of the predefined event and to a corresponding time-based extent in the input data;
determining values of a plurality of features for input to a second stage of processing, the values including (a) whole event values of features associated with the time-based extent of the predefined event, and (b) for each sub-unit of multiple of the sub-units, subunit values of features associated with the time-based extent of the sub-unit, wherein the values of the features associated with the located time-based extent of a sub-unit including at least one value corresponding both to the sub-unit of the predefined event and to a sub-unit not associated with the predefined event;
classifying, in the second stage of processing, based on the whole event values and the subunit values as inputs to the second stage of processing, the possible occurrence of the predefined event as either a true occurrence or a false occurrence by processing the values of the plurality of features; and
operating the user interface, including causing output of an audio signal resulting from classifying the possible occurrence as a true occurrence,
wherein a time-based extent corresponds to a time interval in the audio signal acquired by the microphone.

* * * * *